(12) United States Patent
Linden

(10) Patent No.: US 9,542,099 B1
(45) Date of Patent: Jan. 10, 2017

(54) TOUCH-SENSITIVE RECTANGULAR PANEL AND CONTROL METHOD THEREOF

(71) Applicant: William Linden, Morristown, NJ (US)

(72) Inventor: William Linden, Morristown, NJ (US)

(*) Notice: Subject to any disclaimer, the term of this patent is extended or adjusted under 35 U.S.C. 154(b) by 0 days.

(21) Appl. No.: 14/998,776

(22) Filed: Feb. 16, 2016

(51) Int. Cl.
| G06F 3/041 | (2006.01) |
| H01H 13/72 | (2006.01) |
| G06F 3/023 | (2006.01) |
| G06F 3/0488 | (2013.01) |
| G06F 3/02 | (2006.01) |
| A63F 13/24 | (2014.01) |
| H01H 13/84 | (2006.01) |

(52) U.S. Cl.
CPC ....... G06F 3/04886 (2013.01); G06F 3/04883 (2013.01); *A63F 13/24* (2014.09); *G06F 3/0219* (2013.01); *G06F 3/0221* (2013.01); *H01H 13/84* (2013.01)

(58) Field of Classification Search
CPC .. G06F 3/04886; G06F 3/0219; G06F 3/0221; A63F 13/24; H01H 13/84
See application file for complete search history.

(56) References Cited

U.S. PATENT DOCUMENTS

| 3,847,263 | A | * | 11/1974 | X | B41J 5/10 400/486 |
| 4,613,247 | A | * | 9/1986 | McGunnigle | B41J 5/10 400/484 |
| 6,275,216 | B1 | * | 8/2001 | Kitamura | G06F 3/018 341/28 |
| D707,699 | S | | 6/2014 | Linden | |
| 8,872,777 | B2 | | 10/2014 | Lee | |
| 2004/0202501 | A1 | * | 10/2004 | Kurriss | G06F 3/0219 400/472 |
| 2006/0088357 | A1 | * | 4/2006 | Wedding | G06F 3/0219 400/489 |
| 2006/0228149 | A1 | * | 10/2006 | Harley | G06F 3/04886 400/486 |
| 2007/0256913 | A1 | * | 11/2007 | Wee | A63F 13/06 200/5 A |
| 2008/0180403 | A1 | * | 7/2008 | Park | G06F 3/0237 345/173 |
| 2010/0239346 | A1 | * | 9/2010 | Suess | G06F 3/0202 400/486 |
| 2012/0114406 | A1 | * | 5/2012 | Cenky | G06F 3/02 400/486 |
| 2013/0135243 | A1 | * | 5/2013 | Hirsch | H01H 13/83 345/173 |
| 2014/0015753 | A1 | | 1/2014 | Pai | |

* cited by examiner

Primary Examiner — Jordany Nunez

(57) ABSTRACT

A virtual, touch-sensitive rectangular panel and a method of use for said panel for inputting characters and punctuation, including a lookup table for words of one or two characters, including an algorithm to determine the intended word from a dictionary cross-referencing unique angular sequences for every word in the English language, plus custom words.

3 Claims, 3 Drawing Sheets

TOUCH-SENSITIVE RECTANGULAR PANEL AND CONTROL METHOD THEREOF

BACKGROUND OF THE INVENTION

Field of the Invention

The present disclosure relates to electronic keyboards as digital computer interfaces, more particularly non-QWERTY keyboards for specialized use or efficiency of input.

Background

The standard QWERTY keyboard has been in use since 19th century typewriters, with variations for non-English languages. It is commonly employed for digital computer input with certain additions such as the ESC (escape) key and CTL (control) key. Different layouts exist but are not commonly used except for the numeric keypad based upon the alphanumeric layout of telephone-type dial pads. All are deficient in various ways.

QWERTY inherently promotes errors due to a design which causes unavoidable partial occlusion of the keys. It is tedious to use and difficult to learn. A study in the mid-1980's found it requires 1,500 minutes to become minimally competent to type.

Efforts to improve, curve or split the QWERTY keyboard have been done. Different layouts been suggested but have not proven sufficiently superior to inspire manufacture or migration from the QWERTY standard. There is reluctance to invest time to learn a new layout, especially for an incremental benefit in speed or efficiency.

Thus there remains a need for a new keyboard that improves accuracy and efficiency, and is adapted to modern, digital input.

Efforts in the Prior Art

Digital, particularly mobile computing has made for some improvements. "Virtual" keyboards such as SWYPE® have implemented continuous motion to facilitate single-finger "typing" on mobile screens. But virtual keyboards are still tethered to the QWERTY model, with the same, inherent limitations. Even with the convenience of a dictionary interface and predictive software, virtual keyboards are prone to unintended errors and re-entry of characters.

Swype, for example, being tethered to QWERTY offers no protection from a myriad of common errors, common ones including "ar" for "at", "in" for "im", "if" for "of", "in" for "on" and their reverses, and many others including the familial ones based on partial occlusion of the keyboard such as "p" or "o" and "[" for "p" and "q" for "w" and "s" for either "a" or "w" and their reverses, etc.

Certain prior U.S. patents have addressed computer keyboard inputs and methods. For example, U.S. Pat. No. 8,872,777 to Lee discloses a computer keyboard and control method thereof. Lee teaches integration of composite and peripheral functions into a single keystroke to improve efficiency and to assist inexperienced users. However, Lee's disclosure is adapted for a conventional QWERTY arrangement. Other References include:

Arbib, Michael A., Liebal, Katja, and Pika, Simone, "Primate Vocalization, Gesture, and the Evolution of Human Language," *Current Anthropology,* 2008, 49 (6), 1053-1063;

Arbib, Michael A., "Mirror System Activity for Action and Language is Embedded in the Integration of Dorsal and Ventral Pathways," *Brain and Language,* 2010, 112, 12-24;

Binkofski, Ferdinand and Buecino, Giovanni, "Motor Functions of the Broca's Region," *Brain and Language,* 2004, 89, 362 369;

Cornell University's Math Explorer's Project, Order by Frequency;

"Cryptographical Mathematics", Robert Edward Lewand, The Mathematical Association of America, 2000;

De Rossi, D., Loussi, F., Scilingo, E.P., Carpi, F., Tognetti, A., and Tesconi, M., 25 "Artificial Kinesthetic Systems for Telerchabililation," *Wearable eHealth Systems for Personalized Health Management,* 2004, 209-213;

Edin, B.B. and Johansson, N., "Skin Strain Patterns Provide Kinesthetic Information to the Human Central Nervous System," *Journal of Psychology,* 1995, 487 (Pt 1), 243-251; [00361 Ernst, Marc O. and Bulthoff Heinrich H., "Merging the Senses into a Robust Percept,"

*Trends in Cognitive Science,* 2004, 8 (4), 162-165;

Frisoli, Antonio, Solazzi, Massimiliano, Reiner, Miriam, and Bergamasco, Massimo, "The Contribution of Cutaneous and Kinesthetic Sensory Modalities in Haptic Perception of Orientation," *Brain Research Bulletin,* 2011, 85, 260-266;

Gunner, Esther P., "Somatosensory Cortical Mechanisms of Feature Detection in Tactile and Kinesthetic Discrimination," *Canadian Journal of Physiology and Pharmacology,* 1988, 66(4), 439-454;

Gentilucci, Maurizio and Corballis, Michael C., "From Manual Gesture to Speech: A Gradual Transition," *Neuroscience and Biobehavioral Reviews,* 2006, 30, 949 960;

Gentilucci, Maurizio and Bernardis, Paolo, "Speech and Gesture Share the Same Communication System," *Neuropsychologia,* 2006, 44, 178-190;

Gibson, James J., "Observations on Active Touch," *Psychological Review,* 1962, 69 (6), 477-491;

Helbig, Hannah B. and Ernst, Marc O., "Knowledge about a Common Source Can Promote Visual-Haptic Integration," *Perception,* 2007, 36, 1523-1533;

Johnson, Kenneth O., "The Roles and Functions of Cutaneous Mechanoreceptors," *Current Opinion in Neurobiology,* 2001, 11, 455-461;

Klatzky, Roberta L. and Lederman, Susan J., "Representing Spatial Location and Layout From Sparse Kinesthetic Contacts," *Journal of Experimental Psychology: Human Perception and Performance,* 2003, 29 (2), 310-325;

Lacey, Simon, Campbell, Christine, and Sathian, K., "Vision and Touch: Multiple or Multisensory Representations of Objects?," *Perception,* 2007, 36, 1513-1521;

Lederman, S.J. and Klatsky, R.L., "Haptic Identification of Common Objects: Effects of Constraining the Manual Exploration Process," *Perception & Psychology,* 2006, 66 (4), 618628;

Lederman, S.J. and Klatsky, "Haptic Perception: A Tutorial," *Attention, Perception, & Psychophysics,* 2009, 71 (7), 1439-1459;

Lederman, S.J. and Klatsky, R.L., "Hand Movements: a Window into Haptic Object Recognition," *Cognitive Psychology,* 1987, 19, 342-368;

Linden, W., "Practicing of meditation by school children and their levels of field dependence-independence, test anxiety, and reading achievement," *Journal of Consulting and Clinical Psychology,* 1973, Vol. 41(1), 139-143;

Merabet, Lofti G, Hamilton, Roy, Schlaug, Gottfried, Swisher, Jascha D., Kiriakopoulos, Llaine T., Ptiskel, Naomi, B., Kauffman, Thomas, and Pascual-Leone, Alvaro, "Rapid and Reversible Recruitment of Early Cortex for Touch," *PloS ONE*, 2008, 3(8), e3046;

Mayzner, M.S. and Tresselt, M.E, and Wolen, B.R., "Tables of tetragrarn frequency counts," *Psychonomic Monographs Supplements*, 1965, 1, #4, 79-143;

Picard, Delphine, Labaz, Samuel, Jouffrais, Cristophe. and Monnier, Catherine, "Haptic Recognition of Two-Dimensional Raised-Line Patterns by Early-Blind, Late-Blind, and Blindfolded Sighted Adults," *Perceptino*, 2010, 39(2), 224-235;

Singupogu, Ravikiran B., Sander, Samna T., Burg, Timothy C., and Cobb, William S., "Comparative Study of Haptic Training Versus Visual Training for Kinesthetic Navigation Tasks," *Medicine Meets Virtual Reality*, 2008, 16, 469-471;

Rensink, R.A., O'Regan, J.K., and Clark, J.J., "To See or not to See: the Need for Attention to Perceive Changes in Scenes," *Psychological Science*, 1997, 8, 368-373;

Sathian, K., Zangaladze, A., Hoffman, J.M., and Grafton, S.T., "Feeling with the Mind's Eye: the Roles of Visual Imagery in Tactile Perception," *Optometry & Vision Science*,25 2001 78(5), 276-281;

Seitz, R.J. and Roland, P.E., "Learning of Sequential Finger Movements in Man: A Combined Kinematic and Positron Emission Tomography (PET) Study," *European Journal of Neuroscience*, 1992, 4 (2), 154-165;

Stein, John and Walsh, Vincent, "To see, but not to read; The magnocellular theory of dyslexia," *Trends in Neuroscience*, 1997, 20, 147-152;

Tallal, P, Merzcnich, M.M., Miller, S., and Jenkins, W., "Language learning impairments: integrating basic science, technology, and remediation," 1998, *Experimental Brain Research*, 123, 210-219;

Toni, Ivan, Ramnani, Narcnder, Josephs, Oliver, Ashbumer, John, and Passingham, 5 Richard E., "Learning Arbitrary Visuomotor Associations: Temporal Dynamic of Brain Activity," *Neiaohnage*, 2001, 14 (5), 1048-1057;

Van Beers, R.J., Sittig, A.C., and Gon, J.J., "Integration of proprioceptive and visual position-information. An experimentally supported model," *Journal of Neurophysiology*, 1999, 81(3), 1355-1364;

van der Horst, Bernard J. and Kappers, Astrid M. L., "Haptic Curvature Comparison of Convex and Concave Shapes, "*Perception*, 2008, 37, 1137-1151;

Vogels, Ingrid M.L.C., Kappers, Astrid M.L., and Koenderink, Jan J., "Influence of Shape on Haptic Curvature Perception," *Acta Psychologica*, 1999, 100, 267-289;

Wikipedia.org, "Relative letter frequency in the English language"; and

Young, Richard W., "Evolution of the Human Hand: the Role of Throwing and Clubbing," *Journal of Anatomy*, 2003, 202, 165-174.

To date no known patents or resources teach the structure or use of a keyboard with the arrangement or layout of character sections and other features, or their use, as taught herein.

SUMMARY OF THE INVENTION

The current invention discloses a rectangular panel adapted to continuous-motion input that is sensible, with an easily memorized layout. As a result the current invention can be operated almost immediately.

The preferred embodiment of the current invention is a special, planar relationship between (currently) 39 character-displaying "keys" (generally referred to herein as sections) of differing sizes and shapes. Each section bears a letter or character. The placement of the letter-sections taught herein were strategically chosen according to their occurrence of frequency in English, as well as their frequency of co-occurrence with often-occurring digraphs, trigraphs, etc. In addition, there are two nested oval rings, sectioned into primarily special characters. This non-uniformity of size and shape of the sections facilitates visual and haptic learning of the rectangular panel and sense of surety experienced by users. The rectangular panel of the current invention trivializes the effort to free a user from the limitations of QWERTY, with significant improvement in accuracy and efficiency.

The layout taught in the current invention forces a sequence resulting in a unique angular signature for a target word of three or more letters. The starting point combines with a sequence of subsequent angles of differing degrees to isolate the desired word. The angle sequence is cross-referenced with a table storing the unique word defined by that sequence. The combination renders it virtually impossible to make an unintended error. Thus, there is no need to devote processing resources to a predictive algorithm to derive and display alternative words on an "option bar" as is current with certain keypads on Apple, Samsung and other device displays.

The angle signatures and the starting and ending points are sufficiently different that unintended errors (typos) do not happen. The finger simply makes one "glide" to the intended and visible target field.

Neuropsychological principles are incorporated the rectangular panel design. For example, self-commands (executive functioning) from the brain's frontal lobe: (A) to shift of the eyes, (B) to defocus attention from the rectangular panel and (C) to place attention on the surrounding area and then (D) to re-locate the fingers and hand when returning to the previous rectangular panel location and (E) to mentally refocus, are unnecessary, unlike with a conventional QWERTY keyboard. Using a conventional keyboard is highly oxygen intensive and results in fatigue over lengthy time periods. The QWERTY keyboard is energy intensive in this respect.

The disclosed touch-sensitive rectangular panel's haptic and visual clarity aids phonetic clarity while typing and phonemic recognition when listening or hearing oneself as one is entering text. The panel itself is fully visible, promoting error-free text entry. Further, the users' awareness of being free from the need to edit typos and incorrectly predicted words aids in efficient and enjoyable inputting. Editing functions are all and always fully visible.

The finger simply lifts from the rectangular panel as it does upon finishing any word. The user then taps on the desired punctuation in the center of the lower half of the rectangular panel. One finger simply glides to the intended and visible target fields whether producing a word or making editing functions. This yields an inputting experience that is easy, smooth and enjoyable.

An object of this invention is to provide an input device for characters ensuring each word's angular signature defines a unique word.

Another object of this invention is a user experience with haptic salience for ease of use and learning.

Still another object of this invention is a user experience that is easy and pleasurable without continual focusing, de-focusing and re-focusing.

Still another object of this invention is a accessibility by users that are inexperienced and/or suffer certain disabilities.

Other objectives and advantages of this invention will become apparent from the following description taken in conjunction with the accompanying drawings wherein certain example embodiments are set forth by way of illustration in the accompanying drawings and description provided herein. The various features of novelty, which characterize this invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DETAILED DESCRIPTION OF THE INVENTION

The present disclosure teaches a touch-sensitive panel layout. The layout provides for a unique angle signature for every English word of three or more letters. Single-letter words "a" and "I" are part of a starter dictionary built into the algorithm. All two letter words are controlled via a lookup table. As to all other words of three or more letters, none can be made without one or more angles being made and these angle-signatures are unique.

From each starting letter, the user's finger gliding sequentially from section to section defines a unique series of angles is made to the sequential letters. As the finger is dragged to these positions and moves on, or briefly pauses and then moves on to the final position, one and only one word can be made and this is registered on the screen.

In short, one set of straight or arcing traces completes the desired word uniquely. Pausing the finger or pointing device longer on one letter than one-half of one second is interpreted as a double letter; i.e., pausing on the T mark section distinguishes "latter" from "later".

The present invention requires no overhead for a predictive algorithm nor for an extensive dictionary to be built in. The algorithm automatically accumulates the user's own input of frequently used or custom words. Furthermore, the algorithm counts how many words the User has compiled.

Figure 1:
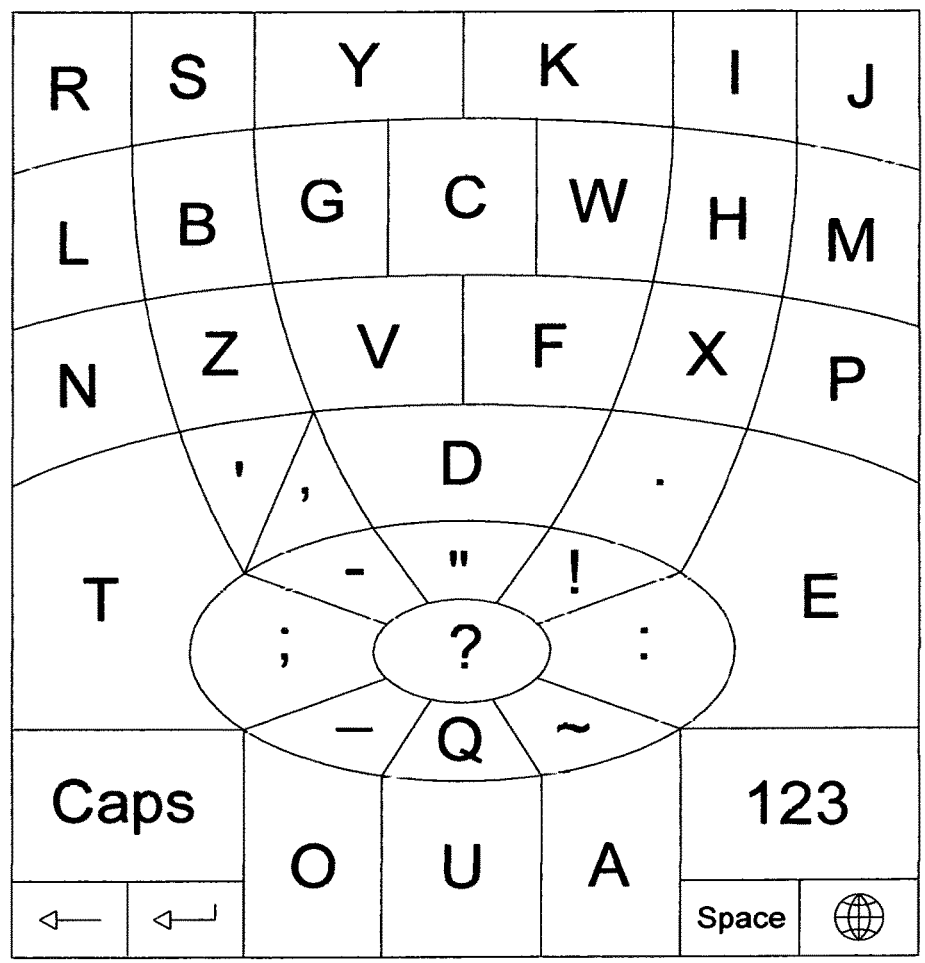
FIG. 1 is a top elevational view of the preferred embodiment of the touch-sensitive panel layout of the current invention.
Figure 2:
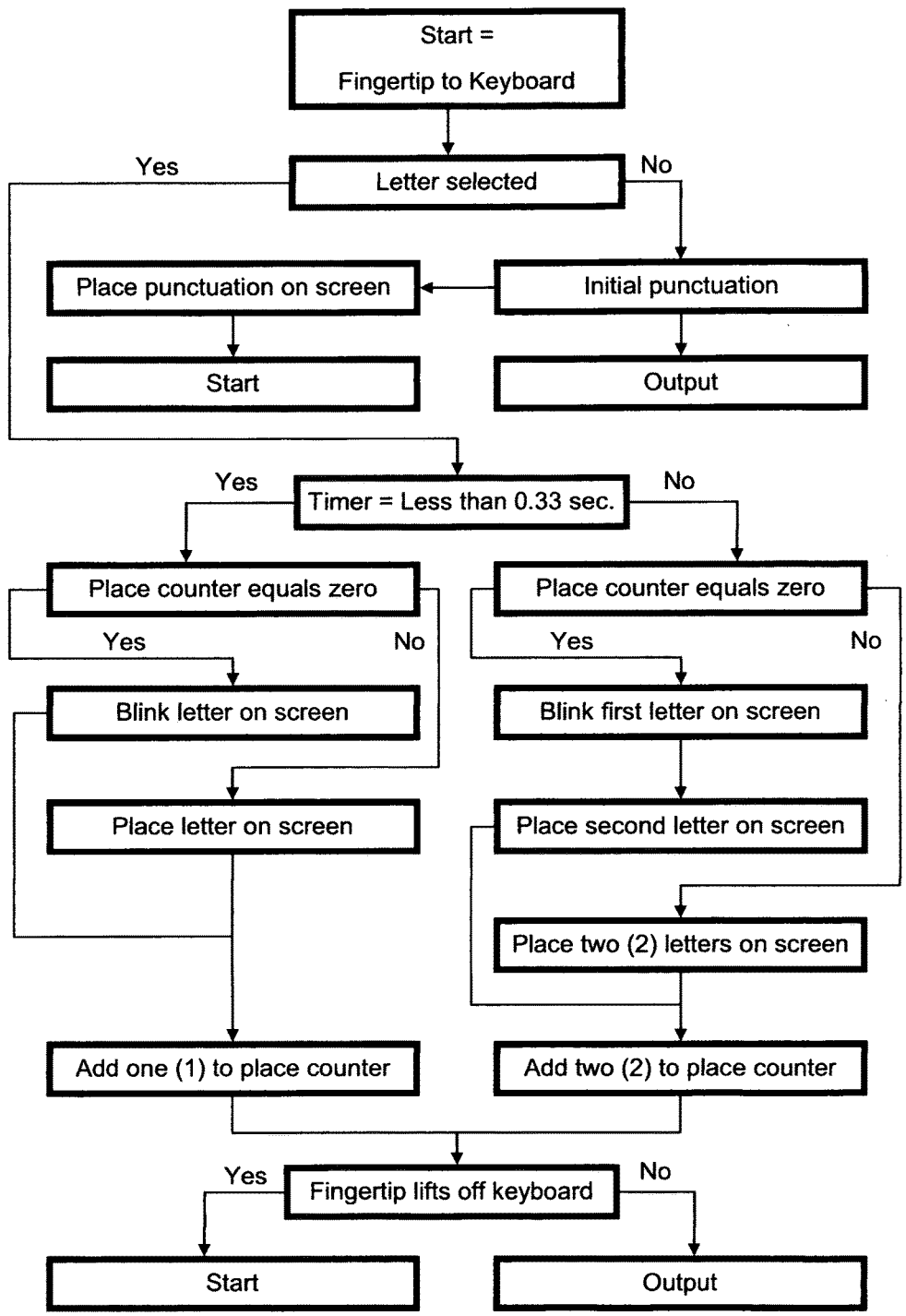
FIG. 2 is a flowchart depicting the control method for using the uniquely positioned panel sections for input.
Figure 3:
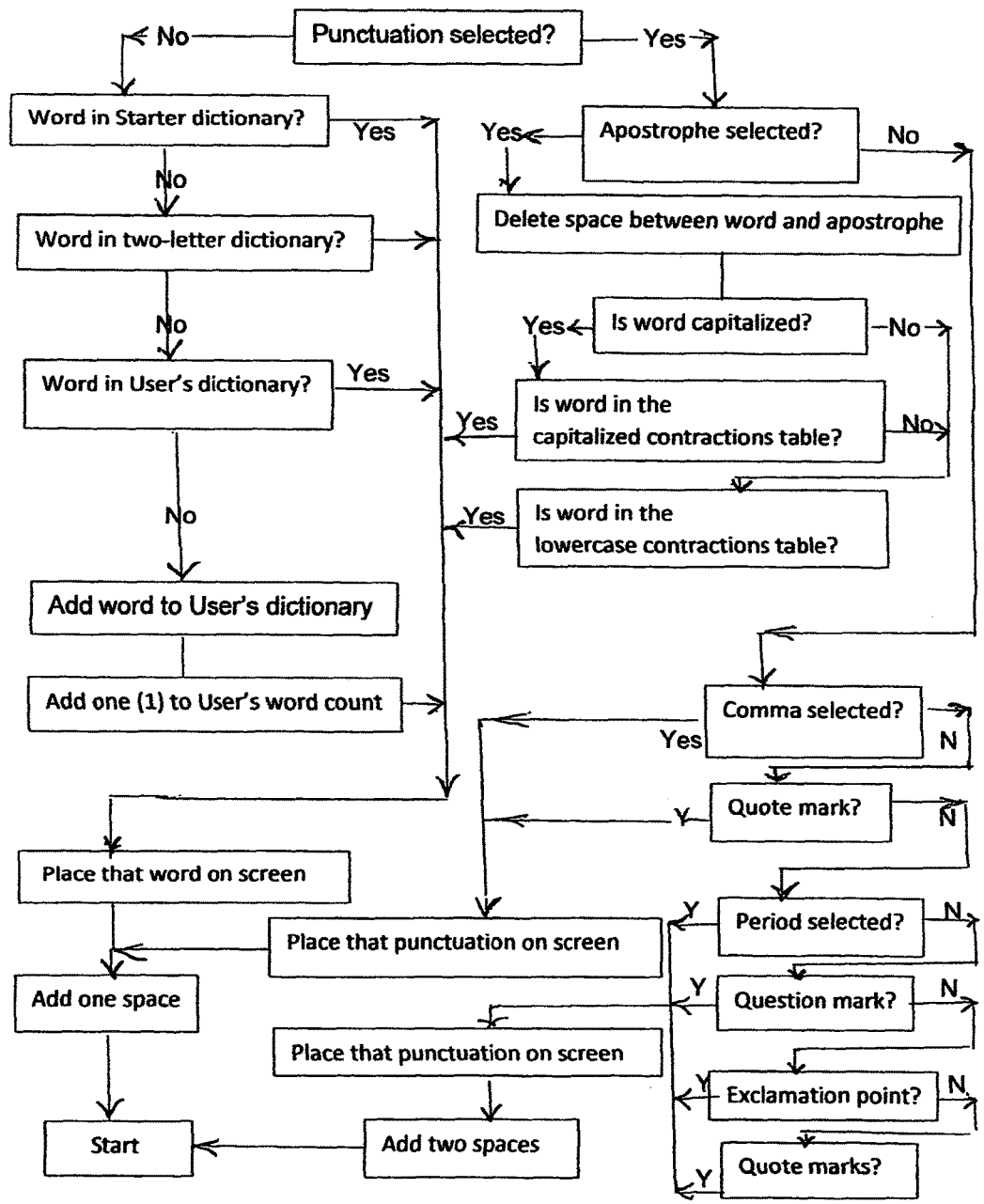
FIG. 3 is a flowchart depicting the control method for using the uniquely positioned panel sections for output.

With reference to FIG. 1, a Caps mark section is disclosed to perform the conventional "Shift" function. The five English vowels ("A", "E", "I", "O" and "U"), plus "T" and the semi-vowel "Y", are located on the perimeter of the rectangular panel.

All punctuation and editing marks are centrally located within the rectangular panel and are fully visible at all times.

The mark sections for the four most frequently occurring letters in English, "E," "T," "A," and "O", are larger than the other letters and are located at the bottom of the rectangular panel to insure full visibility of all other letter. There is no visual occlusion by the hand or fingers.

Frequently occurring digraphs (two-letter combinations) have adjacently disposed mark sections: Q-U, E-X, W-H, C-K, B-L, B-R, R-S, KY and C-K-Y.

Very common phonetic confusions and source of typos, such as between "M" and "N," and between "B" and "P," are eliminated because the mark sections corresponding to these letters are widely separated in the preferred embodiment.

Very frequent typographical errors such as, "if" for "of" and, "in" for "on" and "im" for "in" etc. are avoided by visual separation of these letters from each other in addition to the haptic salience needed to produce the angle signatures to input these words.

Other important digraph combinations, such as BR, BL, GR, GL, and CR and CL are immediately distinguished from the PR and PL digraph that is a source of confusion for non-native English speakers and dyslexics. The mark sections corresponding to the former digraphs are a short run or "glide" to the left, but the mark sections for digraphs PR and PL begin on the far right side and slightly lower and thus are haptically as well as visually distinct. Similarly, the common digraphs, CK CH and WH all run to the right and their respective mark sections are close together for speedy input. These combinations and others allow for very rapid learning by "naive" users such as children and non-native English learners of the rectangular panel.

The mark sections for the "top" seven letters are located the periphery of the disclosed touch-sensitive rectangular panel. Mark sections for seven of the top nine "end-of-word" letters are on the periphery as are the mark sections corresponding to eight of the top nine "end-of word" letters are on the periphery of the rectangular panel. This is the preferred arrangement for a number of reasons. One is that it renders full visibility of the rectangular panel as the user drags (or "glides") a fingertip across the path taken to form the desired word. Another is that full visibility promotes the haptic "feel" of inputting by neurologically supplying a second, parallel data stream to the brain. As these data streams coordinate a user can type virtually haptically, if desired, needing a visual reference only at the start of a desired word.

The top four most frequently occurring letters, "E," "T," "A," and "O" are larger than the other letters and editing functions. The placement of the "bottom" nineteen letters, that is, those which occur in the upper part of the rectangular panel, are based upon digraph, trigraph tetragraph and pentagraph frequencies found in the above-referenced usage data. Thus, the frequently occurring digraphs WI-I, CK, BL, BR, RS, KY, EX and QU and the trigraph CKY are all adjacent to each other.

Two most frequently occurring letters, "E" and "T" are central points of activity along the right and left sides, respectively. These are the largest sections on the panel.

The "A" and "O" are relatively large, equal in size, and disposed at the bottom row of the panel. This placement insures protection from the frequently-made errors noted above, and contributes to full visibility.

The remaining vowel "I" and the semi-vowel "Y" ale also on the periphery but disposed at the top for error minimization/elimination.

There arc masked areas or fields on the panel. These contain certain editing functions (itemized below) and the "Caps" and "123" fields. The user actuates these sections by individual finger points. This allows the fingertip to glide over these field without producing these marks on the screen that is producing the desired word.

When the finger lifts from the touch-sensitive rectangular panel, that action signals the end of a word. A user can then enter a number by touching the 123 mark section, which contains numbers and various other special symbols and frequently encountered foreign marks, or the user can capitalize (icon "Caps"), sustain-capitalize or return to miniscule (lowercase) lettering. Lowercase is the startup default in the preferred embodiment.

Two areas are located the bottom left and bottom right of the panel. The following editing functions are available by single-point entry: apostrophe, comma, period, hyphen, semicolon, dash, enya, colon, exclamation point, and quotation marks. The first three of these are located above the larger or outer central oval and between the T mark section and D mark section, and the D mark section and E mark section, respectively.

The other seven functions complete the outer oval with the exception of the letter Q mark section, which is located just above the letter U mark section which invariably follows it in English.

The inner oval contains the questinn-mark ("?") section. The question-mark requires no shifting.

Another aspect of the panel is the layout's sensitivity to phonetic confusions. Neurologically, as many as seventeen steps are necessary to disambiguate the sound of the letter "B" from the letter "P." Similarly, "D" and "T," and "M" and "N" are sometimes confused, especially by speakers from non-English linguistic communities. The strategic placement of these letters far apart helps learners of the invention and users familiar with other keyboards to isolate these sounds and accurately locate the letters for them and often this becomes a haptic habit rather than reliance on the visual for guidance.

This parallel haptic data stream also applies to digraphs, etc. So for example, the PR and PL digraphs begin on the far side and glide all the way across to the left edge. By contrast, the. BR, BL, GR, GL, CR and CL digraphs begin in the left half of the rectangular panel and proceed in a short glide to the left edge. The haptic "feel" is very different and this left-right differentiation is crucial for remediating children with reading disabilities. The same principle of using the body to feel the difference aids their early learning.

The pattern or glide path is analyzed by a software logarithm which determines the unique word input. Once a user has placed a finger on the starting letter he or she can both visually and haptically enter the order of letters in sequence based upon the locations of pauses and changes of direction.

It will be understood that the above particular embodiment is shown and described by way of illustration only. The principles and the features of the present disclosure ma be employed in various and numerous embodiments thereof without departing from the scope and spirit of the disclosure as claimed. The above-described embodiment illustrated the scope of the disclosure but does not restrict the scope of the disclosure.

What is claimed is:

1. A touch sensitive rectangular panel including a processor comprising: a top surface divided into thirty nine sections;
each said sections is uniquely positioned relative to the planar position of each other said sections;
each said sections uniquely identified by a mark;
wherein the upper left corner section of said panel is identified by a R mark,
a section identified by a S mark located such that it shares a common border with the right side of said R mark section, and is contiguous with a section of the top side of said panel,
a section identified by a Y mark located such that it shares a common border with the right side of said S mark section, and is contiguous with a section of the top side of said panel,
a section identified by a K mark located such that it shares a common border with the right side of said Y mark section, and is contiguous with a section of the top side of said panel,
a section identified by a I mark located such that it shares a common border with the right side of said K mark section, and is contiguous with a section of the top side of said panel,
a section identified by a L mark located such that it shares a common border with the lowest side of said R mark section, and is contiguous with a section of the left side of said panel,
a section identified by a N mark located such that it shares a common border with the lowest side of said L mark section, and is contiguous with a section of the left side of said panel,
a section identified by a T mark located such that it shares a common border with the lowest side of said N mark section, and is contiguous with a section of the left side of said panel,
said T section further bounding by a bottom section perpendicular to the left side of said panel and a right side composed of a straight line upper section and a curved lower section,
said straight line upper section and said curved line lower section approximately equal in length;
wherein the upper right corner section of said panel is identified by a J mark,
a section identified by a M mark located such that it shares a common border with the lowest side of said J mark section, and is contiguous with a section of the right side of said panel,
a section identified by a P mark located such that it shares a common border with the lowest side of said M mark section, and is contiguous with a section of the right side of said panel,
a section identified by a E mark located such that it shares a common border with the lowest side of said P mark section, and is contiguous with a section of the right side of said panel,
said E section further bounding by a bottom section perpendicular to the right side of said panel, and a left side composed of a straight line upper section and a curved line lower section,
said straight line upper section and said curved line lower section approximately equal in length;
wherein the lower left corner section of said panel is identified by a Caps mark,
a section identified by a O mark located such that it shares a common border with the right side of said Caps mark section, and is contiguous with a section of the bottom side of said panel,
a section identified by a U mark located such that it shares a common border with the right side of said O mark section, and is contiguous with a section of the bottom side of said panel,
a section identified by a A mark located such that it shares a common border with the right side of said U mark section, and is contiguous with a section of the bottom side of said panel;
wherein the lower right corner section of said panel is identified by a 123 mark,
a section identified by a B mark located such that it shares a common border with the right side of said L mark section, and shares a common border with the bottom side of said S mark section, a section identified by a Z mark located such that it shares a common border with the right side of said N mark section, and shares a common border with the bottom side of said B mark section, a section identified by a H mark located such that it shares a common border with the left side of said M mark section, and shares a common border with the bottom side of said I mark section, a section identified by a X mark located such that it shares a common border with the left side of said P mark section, and shares a common border with the bottom side of said H mark section, a section identified by a period mark located such that it shares a common border with said straight line section of said left side of said E mark section, and shares a common border with the bottom side of said X mark section, a section identified by a G mark located such that it shares a common border with the left side of said B mark section, and shares a common border with approximately two thirds the left side of the bottom boarder of said Y mark section, a section identified by a C mark located such that it shares a common border with the left side of said G mark section, and shares a common border with approximately one third the right side of the bottom boarder of said Y mark section and with approximately one third the left side of the bottom boarder of said K mark section, a section identified by a W mark located such that it shares a common border with the left side of said C mark section, and shares a common border with approximately two thirds the right side of the bottom boarder of said K mark section, a section identified by a V mark located such that it shares a common border with the left side of said Z mark section, shares a common border with the bottom boarder of said G mark section and shares a common border with approximately one third of the left side of the bottom boarder of said C mark section, a section identified by a F mark located such that it shares a common border with the left side of said V mark section, shares a common border with approximately one third of the right side of the bottom Lowder of said C mark section, and shares a common border with the bottom boarder of said W mark section, a section identified by a D mark located such that it shares a common border with the left side of said period mark section, shares a common border with the bottom boarder of said V mark section and shares a common border with the bottom boarder of said F mark section, a section identified by an apostrophe mark located such that it shares a common border with the bottom boarder of said Z mark section and shares a common border with the top of the right side of the straight line upper section of said T mark section, a section identified by a comma mark located such that it shares a common border with the right side of said apostrophe mark section, and shares a common border with the left side of said D mark section;

wherein an oval section located such that said oval's circumference shares a common board with the bottom border of said comma mark section, the bottom border of said D mark section, the bottom border of said D period section, said curved line lower section of the left side of said E mark section, the upper left point of said 123 mark section, the upper border of said A mark section, the upper border of said U mark section, the upper border of said O mark section, the upper right point of said Caps mark section, and said curved line lower section of the right side of said T mark section, a section identified by a quotation mark located such that it shares a common border with the lowest side of said D mark section, and resides within said oval, a section identified by an exclamation mark located such that it shares a common border with the lowest side of said period mark section, and resides within said oval, a section identified by colon mark located such that it shares a common border with said curved line lower section of the left side of said E mark section, and resides within said oval, a section identified by an enya accent mark located such that it shares a common border with the top side of said A mark section, and resides within said oval, a section identified by a Q mark located such that it shares a common border with the top side of said U mark section, and resides within said oval, a section identified by a dash mark located such that it shares a common border with the top side of said O mark section, and resides within said oval, a section identified by semi-colon mark located such that it shares a common border with said curved line lower section of the right side of said T mark section, and resides within said oval, a section identified by a hyphen mark located such that it shares a common border with the lowest side of said comma mark section, and resides within said oval, a section identified by a question mark located such that it shares a common border with
the lower side of said quotation mark section,
the lower left side of said exclamation mark section,
the left side of said colon mark section,
the upper left side of said enya accent mark section,
the upper side of said Q mark section,
the upper right point of said dash section,
the right side of said semi-colon section, and
the lower right side of said hyphen section.

2. The panel as claimed in claim 1, wherein
the area of said J mark section is approximately the same area as said R mark section area,
the area of said S mark section is approximately the same area as said R mark section area,
the area of said period mark section is approximately the same area as R mark section area,
the area of said semi-colon mark section is approximately the same area as R mark section area,
the area of said colon mark section is approximately the same area as R mark section area,
the area of said L mark section is approximately the same area as said R mark section area,
the area of said M mark section is approximately the same area as said R mark section area,
the area of said N mark section is approximately the same area as said R mark section area, the area of said P mark section is approximately the same area as said R mark section area, the area of said I mark section is approximately the same area as said R mark section area, the area of said B mark section is approximately the same area as said R mark section area, the area of said H mark section is approximately the same area as said R mark section area, the area of said Z mark section is approximately the same area as said R mark section area, the area of said X mark section is approximately the same area as said R mark section area, the area of said G mark section is approximately the same area as said R mark section area, the area of said V mark section is approximately the same area as said R mark section area, the area of said F mark section is approximately the same area as said R mark section area, the area of said question mark mark section is approximately the same area as said R mark section area, the area of said C mark section is approximately one and one half times the same area as said R mark section area, the area of said Y mark section is approximately one and one half times the same area as said R mark section area, the area of said K mark section is approximately one and one half times the same area as said R mark section area, the area of said U mark section is approximately one and one half times the same area as said R mark section area, the area of said D mark section is approximately two times the same area as said R mark section area, the area of said O mark section is approximately two times the same area as said R mark section area, the area of said A mark section is approximately two times the same area as said R mark section area, the area of said T mark section is approximately four time times the same area as said R mark section area, the area of said E mark section is approximately four time times the same area as said R mark section area, the area of said Caps mark section is approximately three time times the same area as said R mark section area, the area of said 123 mark section is approximately three time times the same area as said R mark section area, and the area of each of the other marked sections are approximately one half times the same area as said R mark section area.

3. A control method for using the panel as claimed in claim 1, wherein each said thirty nine sections is capable of accepting finger touch as an input on a virtual keyboard coupled to a computer programmed to perform the steps of:

receiving signal for each of said thirty nine sections;

associating said signal with a section of said thirty nine section which sent said signal;

correlating said association with previously defined letters or punctuation marks;

accumulating said correlations in the order received;

identifying words based on comparing said accumulations with both list of known words and a word formation algorithm; and displaying said identified words.

* * * * *